G. B. DRUM.
INSECT DESTROYER.
No. 187,258. Patented Feb. 13, 1877.
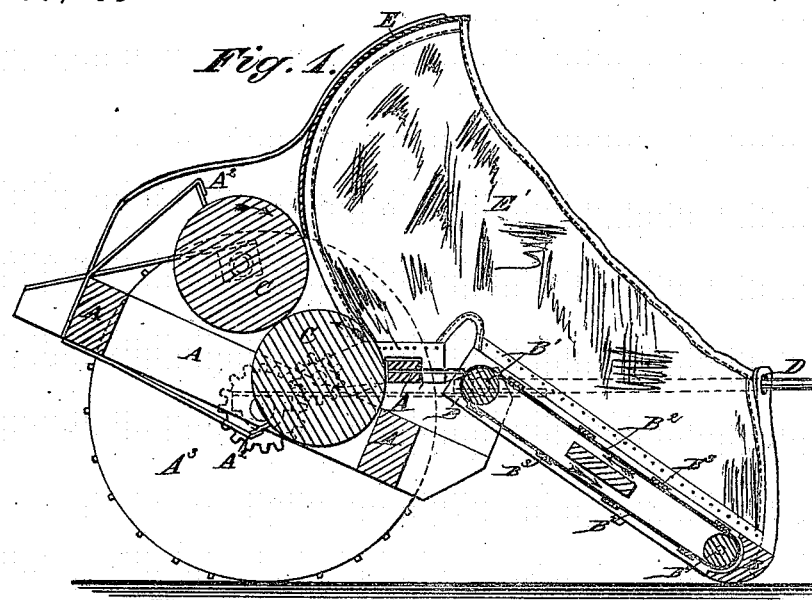
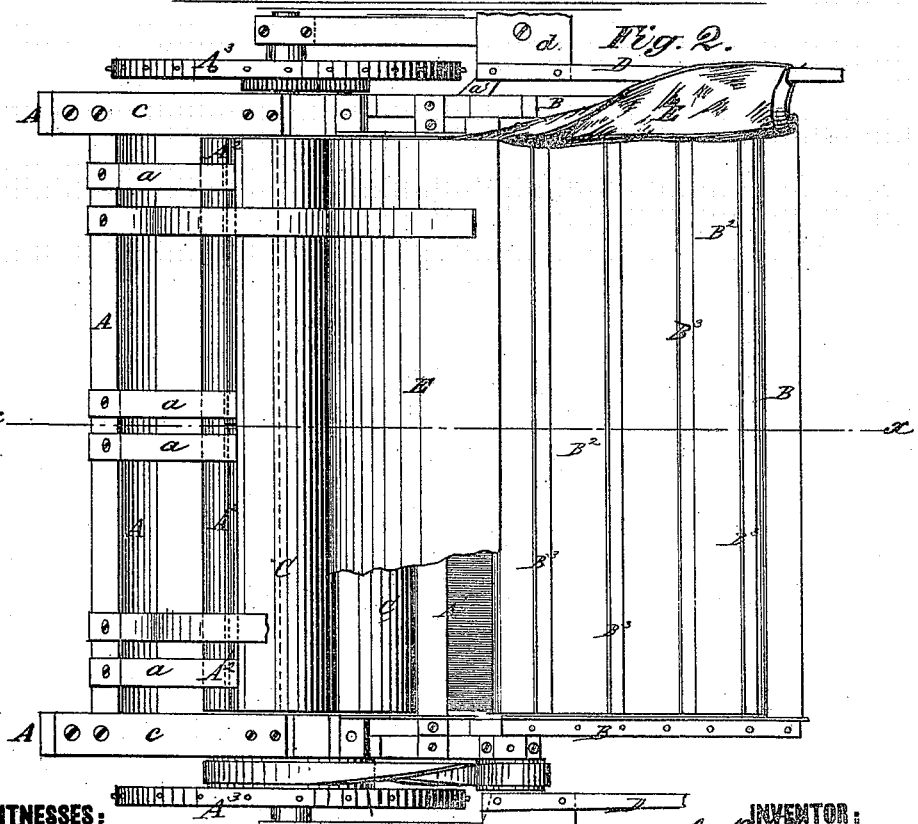
WITNESSES:
H. Rydquist.
J. H. Scarborough.
INVENTOR:
G. B. Drum
BY
ATTORNEYS.

UNITED STATES PATENT OFFICE.

GEORGE B. DRUM, OF SYRACUSE, NEBRASKA.

IMPROVEMENT IN INSECT-DESTROYERS.

Specification forming part of Letters Patent No. 187,258, dated February 13, 1877; application filed November 11, 1876.

*To all whom it may concern:*

Be it known that I, GEORGE B. DRUM, of Syracuse, in the county of Otoe and State of Nebraska, have invented a new and useful Improvement in Insect-Destroyer, of which the following is a specification:

Figure 1 is a vertical section on line $x$. Fig. 2 is a plan view with a part of the top removed, showing the mechanism.

Similar letters of reference indicate corresponding parts.

The object of this invention is to provide a mechanism for the purpose of destroying grasshoppers and other noxious insects.

This invention consists in a vehicle containing a combined catching and destroying mechanism, to be drawn about the fields for the purpose of ridding them of noxious insects.

This mechanism is constructed as follows: To the front of the principal frame A of the vehicle is attached, by a hinge or movable joint, a scraper-frame, B. The front edge of B is carried along or near the ground for the purpose of collecting and starting the insects from the ground. Within the frame B are two rolls, $B^1$ $B^1$, carrying an endless apron, $B^2$, of canvas or other flexible material. On $B^2$ are secured one or more strips of wood or metal, $B^3$, the purpose of these strips $B^3$ being to keep the canvas straight, and carry the insects forward upon the apron, and prevent their rolling out and escaping. The rolls $B^1$ and apron $B^2$ are driven by a belt from one of the wheels $A^3$ of the vehicle. Upon the frame A is secured a brush, $A^1$, to sweep the insects and drive them toward the rolls C, and also to prevent them from being carried around with the apron $B^2$. Upon the frame A, and immediately in the rear of the brush $A^1$, are placed two or more crushing-rolls, C C, of wood or metal. These rolls C C run in boxes, connected by the spring $c$ for the purpose of giving the rolls C C a yielding or elastic pressure upon each other. The rolls C C are driven by gearing from one of the wheels $A^3$ of the vehicle, and in such direction that the insects passing over the brush are drawn through the rolls C C and killed, falling upon the ground, or if it is desired to collect the insects for any purpose, a bag may be attached to the frame A, by hooks or otherwise, below the rolls C C.

Upon the frame A are screwed, by means of springs or elastic connections $a$, two scrapers, $A^2$, of metal or wood, which, bearing upon the surfaces of the rolls C C, serve to keep them clean and prevent the insects from being carried around them and clogging the machine. To the top of the frame A is secured a light frame or top, E, of wood or metal, covered with the same or with canvas, and having two side wings, E' E', also of canvas. The side-wings E' are also secured to the frame of the apron $B^2$, forming with that and with the top E a hopper of entrance to the rolls C C, of large area, to catch the insects and prevent their flying over the machine and escaping. The wings E' are also attached to the shafts D D, or to the harnesses of the horses, to assist in spreading and enlarging the area of the hopper. The frame A is carried upon two wheels, $A^3$ $A^3$, which have projections upon their periphery to give them the necessary driving-power required by the rolls B and C. To each side of the frame A are secured backets $a'$, which extend back and are attached to the outer end of axles of $A^3$ $A^3$. Upon the brackets $a'$ are pivoted shafts D, by means of which horses can be harnessed to the vehicle for the purpose of drawing it, the pivots $d$ giving the horses the necessary freedom and independence of motion, and also allowing the side wings E' to be drawn out or spread out by the action of the horses.

Having thus described my invention, I claim as new, and desire to secure by Letters Patent—

1. The combination, with a wheeled vehicle, of the hinged frames A B, the former provided with brush, $A^1$, spring-connected scrapers $A^2$, and spring-connected rolls C, and the latter with rolls $B^1$ and endless apron $B^2$, having the strips $B^3$, the winged top E E' being arranged thereover, as and for the purpose specified.

2. The shafts D of an insect-destroyer, connected with the extension-ends of the journals of axle, substantially as and for the purpose described.

GEORGE B. DRUM.

Witnesses:
THOMAS WILSON,
ISAAC LE DROYT.